United States Patent [19]

Yamakawa

[11] 4,412,320
[45] Oct. 25, 1983

[54] RELEASABLE COVER LOCKING DEVICE

[75] Inventor: Akio Yamakawa, Atsugi, Japan

[73] Assignee: Sony Corporation, Tokyo, Japan

[21] Appl. No.: 296,492

[22] Filed: Aug. 26, 1981

[30] Foreign Application Priority Data

Aug. 29, 1980 [JP] Japan .......................... 55-122602[U]

[51] Int. Cl.³ .......................... G11B 1/00; E05B 47/00; E05C 3/06
[52] U.S. Cl. ........................................ 369/79; 70/279; 292/201
[58] Field of Search ................. 369/79; 292/201, 203; 70/159, 279

[56] References Cited

U.S. PATENT DOCUMENTS

3,940,148  2/1976  Torrington et al. .................. 369/79
4,135,721  1/1979  Camerik ................................. 369/79

Primary Examiner—Steven L. Stephan
Attorney, Agent, or Firm—Lewis H. Eslinger; Alvin Sinderbrand

[57] ABSTRACT

A releasable cover locking device associated with a cover of a record player of the type in which a record disk is rotated during a reproduction operation when power is supplied to the record player, includes a locking mechanism having a locking lever biased about a shaft to a locking position to lock the cover into a closed position; a first release mechanism including a release link rotatably mounted on the shaft for biasing the locking lever to an unlocked position, a reciprocable rod connected to the release link and an electromagnetic plunger for actuating the reciprocable rod when power is supplied to the apparatus and when the rotational speed of the record disk falls below a predetermined value wherein the release link biases the locking lever to the unlocked position; and a second release mechanism including an arm rotatably mounted on the shaft for biasing the locking lever to the unlocked position, a stop lever connected to the arm through an operating link, a positioning mechanism for positioning the arm into opposing relation to the locking lever when the power supplied to the record player is interrupted so that the stop lever can be actuated to cause the arm to bias the locking lever to the unlocked position and to position the arm out of the opposing relation when power is supplied to the record player so that the arm cannot bias the locking lever to the unlocked position.

13 Claims, 12 Drawing Figures

RELEASABLE COVER LOCKING DEVICE

BACKGROUND OF THE INVENTION

1. Field of the Invention

This invention relates generally to record playing apparatus and, more particularly, is directed to a releasable cover locking device for a record playing apparatus.

2. Description of the Prior Art

Audio and video record players are well-known in the art in which a record disk is rotated at a relatively high speed while information is reproduced therefrom. Because of the high rotational speed used, it may be dangerous if the user inadvertently touches or contacts the disk during the reproduction operation. Further, in the case of a video disk, where a laser beam is used to reproduce signals recorded on the disk, it may be dangerous if the laser beam comes into contact with the user. It has therefore been necessary, in many instances, to provide a cover on the record players so as to avoid the above-described dangers.

Generally, such covers are hingedly secured at the rear edges thereof to the record player bodies and the front of each cover includes a latch which cooperates in a mating arrangement with a locking mechanism of the apparatus. A push-button or the like is provided for releasing the latch from the locking mechanism so that the cover can be opened. However, if the locking mechanism is opened or released while the record disk is still rotating, the aforementioned dangers are still present.

OBJECTS AND SUMMARY OF THE INVENTION

Accordingly, it is a principal object of this invention to provide a releasable cover locking device that avoids the above-described difficulties encountered with the prior art.

More particularly, it is an object of this invention to provide a releasable cover locking device that ensures a high degree of safety during operation of a record playing apparatus with which it is used.

It is another object of this invention to provide a releasable cover locking device having a locking mechanism which is adapted to be released only after the rotational speed of a record disk is less than a predetermined safe value.

It is still another object of this invention to provide a releasable cover locking device having a locking mechanism which is adapted to be released in an electrically controllable operation when power is supplied to the record playing apparatus and when the speed of rotation of the record disk therein is less than a predetermined value, and is adapted to be released in a mechanically controllable operation when the source of power to the apparatus is interrupted.

In accordance with an aspect of this invention, a releasable cover locking device is provided for a recording and/or reproducing apparatus of the type in which a record medium is adapted to be moved when power is supplied to the apparatus, the releasable cover locking device including releasable locking means; first release means for releasing the locking means when power is supplied to the apparatus and when the speed of movement of the record medium is less than a predetermined value; and second release means for releasing the locking means when the power supplied to the apparatus is interrupted.

The above, and other, objects, features and advantages of the present invention will become readily apparent from the ensuing detailed description of an illustrative embodiment of the invention which is to be read in connection with the accompanying drawings.

DETAILED DESCRIPTION OF A PREFERRED EMBODIMENT

Figure 1:
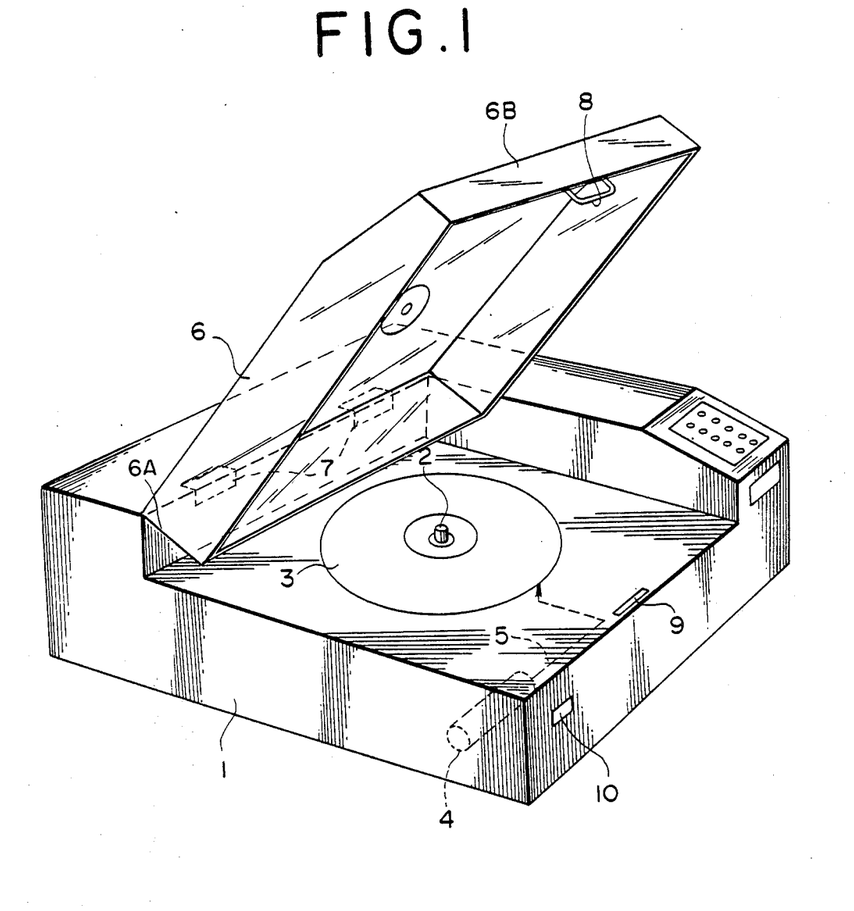
FIG. 1 is a perspective view of a record player with which the present invention can be utilized.

Referring to the drawings in detail, and initially to FIG. 1 thereof, there is shown a record playing apparatus 1 of the laser disk type with which the present invention is adapted to be used. As shown therein, record playing apparatus 1 includes a rotatable drive shaft 2 for rotating a video disk 3 at a high speed. A laser beam 5, shown by the dashed line in the figure is generated by a laser tube 4 and is directed to the underside or lower surface of video disk 3 by an optical system (not shown) and the beam, when reflected therefrom, is used to reproduce video signals recorded on the disk.

As previously discussed, however, a dangerous situation may result if the user touches or contacts video disk 3 while the latter is rotated at such high speed. This danger is increased if the user inadvertently comes into contact with laser beam 5. Accordingly, record playing apparatus 1 includes a cover or lid 6 which is hingedly attached at its rear edge 6A to the apparatus by means of hinges 7. The cover 6 is adapted to be lockingly engaged to the apparatus by means of a lock bar or latch 8 provided on the front edge 6B of cover 6 and a locking mechanism 9 is provided at the front end of the apparatus. In particular, locking mechanism 9 cooperatively engages with lock bar 8 when cover 6 is closed to prevent the cover from being inadvertently opened. A cover opening push-button 10 is provided on the front panel of the apparatus for releasing, that is, unlocking, locking mechanism 9 so that cover 6 can be opened, for example, to remove or change the video disk. As previously discussed, however, if cover 6 is permitted to be opened while video disk 3 is rotating at a high speed, a dangerous situation may result.

Figure 2A:
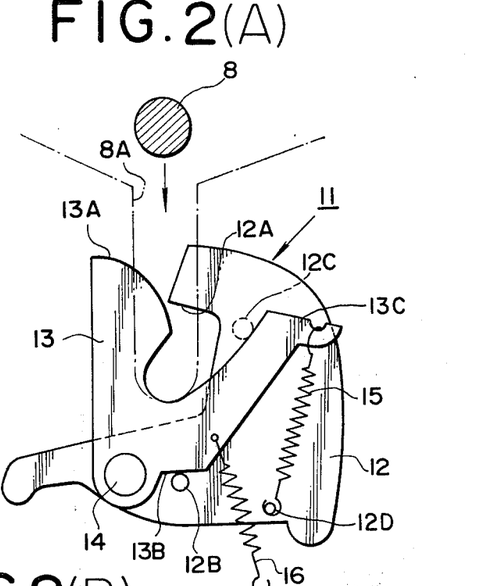
FIGS. 2(A)-(D) are side plan views of a locking mechanism according to one embodiment of this invention in various operative conditions.

Accordingly, the present invention provides a releasable locking mechanism which is only released when the rotational speed of video disk 3 is less than a predetermined value (including the stopped condition). In particular, a locking mechanism 11 is provided in place of locking mechanism 9 and is shown in FIG. 2(A) in the condition where cover 6 is open. Locking mechanism 11 includes a locking lever 12 and a detecting lever 13, both pivotally supported at their lower ends by a rotatable support shaft 14. Locking lever 12 is adapted to engage and retain lock bar 8 and is formed at its upper end with a bar engaging portion 12A which is bent so as to have an arcuate shape centered about support shaft 14, whereby lock bar 8, and consequently, cover 6, can be locked in a closed position. Locking lever 12 is also provided at its lower end with a pin 12B which projects horizontally from one side thereof and also includes a pivot rod 12C which projects horizontally from the opposite side thereof.

Detecting lever 13 is formed at its upper end with a detecting surface 13A having a gentle arcuate configuration in opposing relation to engaging portion 12A of locking lever 12. Detecting lever 13 also includes a shoulder 13B at the lower end thereof. A tension spring 15 is connected between a pin 12D at the lower end of locking lever 12 and an arm 13C of detecting lever 13 so as to bias bar engaging portion 12A and detecting surface 13A toward each other about support shaft 14. The extent that bar engaging portion 12A and detecting surface 13A are biased toward each other is limited by the abutting engagement of shoulder 13B on pin 12B, as shown in FIG. 2(A). Further, the angular relation of locking lever 12 and detecting lever 13 about support shaft 14 is determined by a spring 16 which is connected at one end to the apparatus and at its other end to detecting lever 13 so as to bias locking lever 12 and detecting lever 13 together in a clockwise direction, as viewed in FIG. 2(A), about support shaft 14.

Figure 2B:
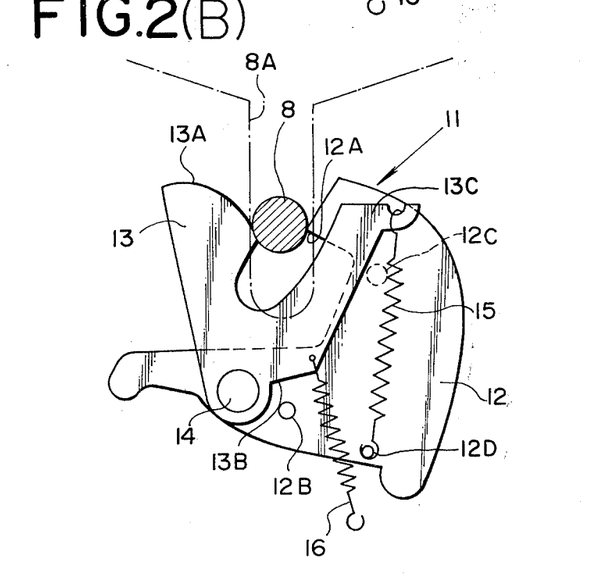
Figure 2C:
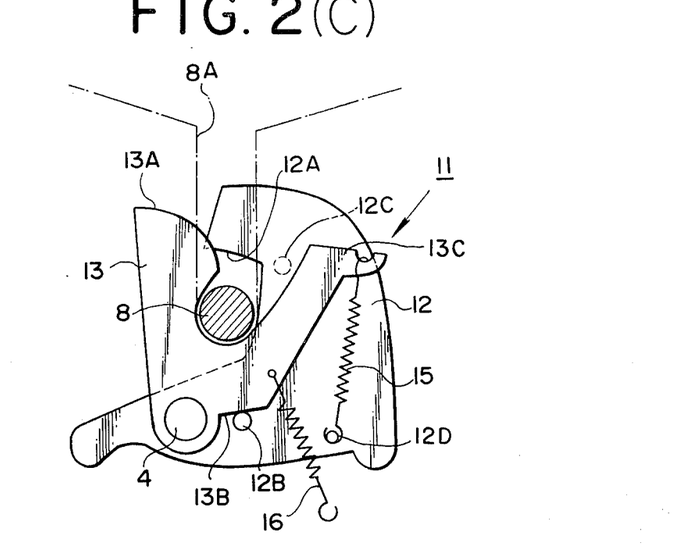
Figure 2D:
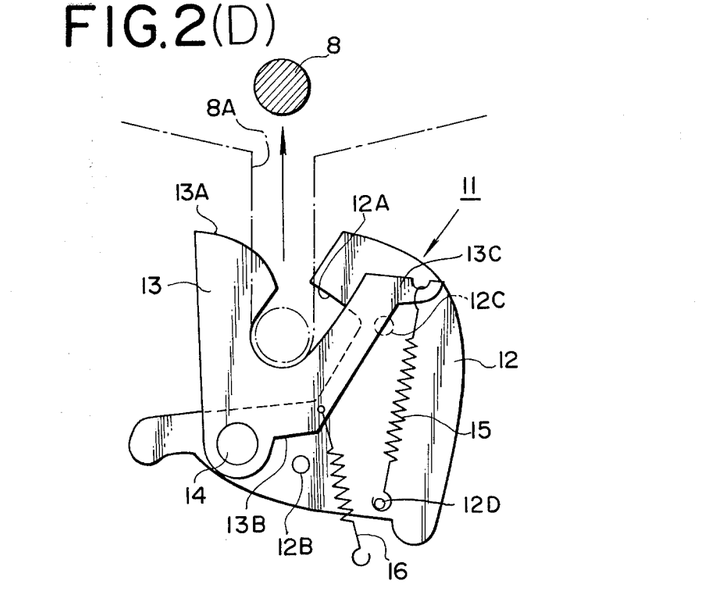

In operation, as cover 6 is closed, lock bar 8 is guided by a lock guide 8A as it descends and approaches locking mechanism 11 of the apparatus. As it descends, lock bar 8 abuts against detecting surface 13A and the upper arm of locking lever 12 to pivotally separate locking lever 12 and detecting lever 13 about support shaft 14 and against the action of tension spring 15. In particular, locking lever 12 is displaced in a clockwise direction about support shaft 14 and detecting lever 13 is displaced in a counter-clockwise direction about support shaft 14, as shown in FIG. 2(B). As lock bar 8 continues its descent past detecting surface 13A of detecting lever 13, springs 15 and 16 operate to rotate locking lever 12 and detecting lever 13 about support shaft 14 to their original positions so as to lockingly engage lock bar 8 therebetween, and thereby lock cover 6 in its closed position, as shown in FIG. 2(C). To open cover 6, locking lever 12 is pivoted clockwise, as viewed in FIG. 2(D), against the tension of spring 15, to allow lock bar 8 to be removed from locking mechanism 11, and thereby permit cover 6 to be opened.

Figure 3:
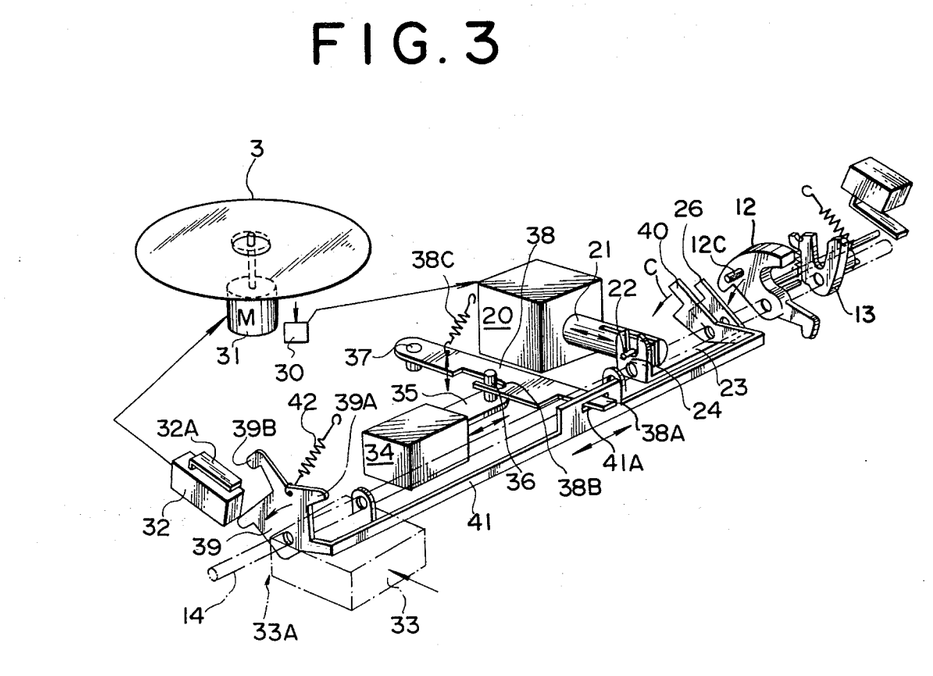
FIG. 3 is a perspective view of a releasable cover locking device according to one embodiment of this invention.
Figure 4:
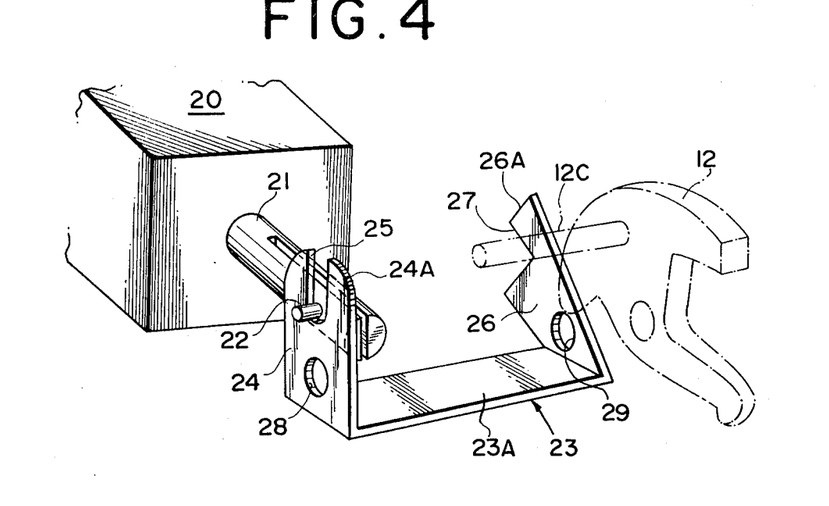
FIG. 4 is an enlarged perspective view of an electrical lock releasing mechanism that can be utilized in the releasable cover locking device of FIG. 3.
Figure 5:
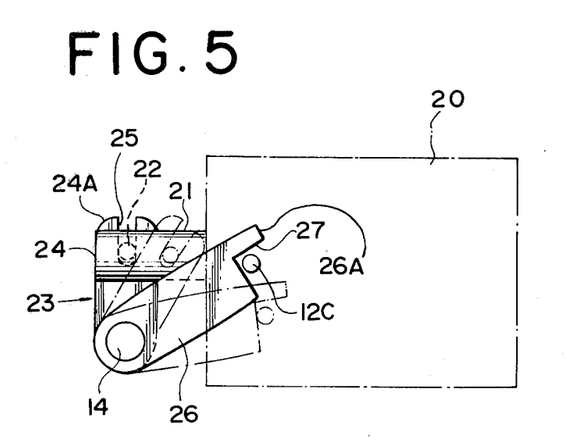
FIG. 5 is a side plan view of the electrical lock releasing mechanism of FIG. 4.

Referring now to FIG. 3, there is shown a release mechanism according to one embodiment of this invention for releasing or unlocking locking mechanism 11. As shown therein, an electrically controlled portion of the release mechanism includes an electromagnetic plunger 20 having a reciprocable rod 21 with its free end engaging a release link 23. In particular, as shown more clearly in FIGS. 4 and 5, release link 23 includes an upstanding driven arm 24 and an inclined, upstanding transmitting arm 26 connected together by a connecting member 23A. Arms 24 and 25 having coaxial apertures 28 and 29 at their lower ends through which support shaft 14 is inserted to rotatably journal release link 23 thereabout. Further, an engaging recess 25 of a U-shaped configuration is provided at the upper end 24A of driven arm 24 for engaging a drive pin 22 extending horizontally from reciprocable rod 21. In like manner, an actuating surface 27 is provided at the upper end 26A of transmitting arm 26 for engaging pivot rod 12C extending horizontally from one side of locking lever 12.

When power is supplied to record playing apparatus 1, a motor 31 rotates video disk 3 at a desired rotational speed during the reproducing operation. A detecting device 30 detects the rotational frequency, that is, the speed, of video disk 3 and supplies a corresponding output to electromagnetic plunger 20. Normally, when video disk 3 is rotated at a high speed, detecting device 30 supplies an appropriate signal to electromagnetic plunger 20 to maintain rod 21 in an extended position. This results in locking mechanism 11 maintaining lock bar 8 and cover 6 in their respective locked conditions.

Figure 6:
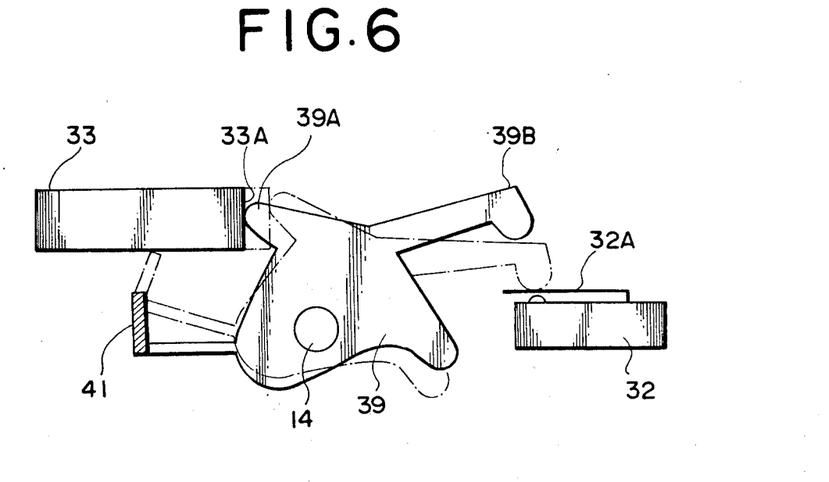
FIG. 6 is a side plan view of a stop lever of a mechanical lock releasing mechanism that can be utilized in the releasable cover locking device of FIG. 3.
Figure 7:
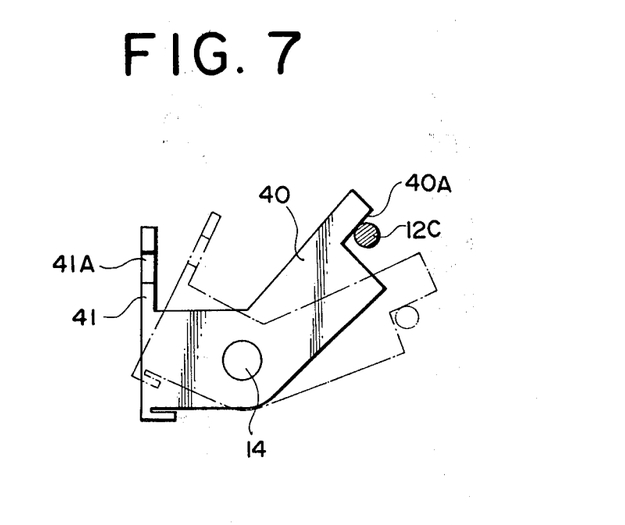
FIG. 7 is a side plan view of an inclined arm of a mechanical lock releasing mechanism that can be used with the releasable cover locking device of FIG. 3.

The apparatus further includes a cover opening button 33 which, when depressed, as shown more particularly in FIG. 6 by the dot-dash lines, causes a pressure surface 33A thereof to abut against a driven arm 39A of a stop lever 39 to bias the latter about support shaft 14 and against a return spring 42. As a result, an actuating arm 39B of stop lever 39 engages a corresponding operating portion 32A of a microswitch 32 which controls motor 31 to stop the rotation of video disk 3. When the speed or frequency of rotation of video disk 3 falls below a predetermined value (which includes the stopped condition), plunger 20, in response to the output from detecting device 30 retracts reciprocable rod 21. This, in turn, causes release link 23 and accordingly, transmitting arm 26 thereof, to be rotated in the clockwise direction, as viewed in FIG. 5. As a result, locking lever 12 is rotated clockwise, as viewed in FIG. 2(D), against the tension of spring 15 so as to release lock bar 8, whereby cover 6 can be opened. It should be appreciated that, with this arrangement, cover 6 can only be opened when the rotational speed of video disk 3 is low and, in fact, when it is less than a predetermined safe speed.

If, however, the power supplied to record playing apparatus 1 is turned OFF or interrupted while cover 6 is in its locked condition, electromagnetic plunger 20 is not actuated to release locking mechanism 11. In such case, a mechanically controlled portion of the release mechanism of FIG. 3 is provided. In particular, and referring to FIGS. 3, 7, 8(A) and 8(B), an electromagnetic plunger 34 having a reciprocable rod 35 with an upstanding pin 36 at the free end thereof is provided. A swing or positioning link 38 is pivotally supported at one end thereof about a pivot pin 37 and is adapted for movement in the horizontal and vertical directions. Swing link 38 is normally biased about pivot pin 37 in a counter-clockwise direction, as viewed in FIG. 8(A), by means of a tension spring 38C (FIG. 3). A recess 38B is provided approximately midway along one edge of swing link 38 within which upstanding pin 36 is located for engagement therewith during all vertical and horizontal movements of swing link 38.

An operating link 41 is integrally attached at one end thereof to the lower end of stop lever 39 and is arranged in parallel relation to support shaft 14. Operating link 41 also includes a slot 41A through which the free end 38A of swing link 38 is disposed for lateral movement therein. The other end of operating link 41 is integrally attached to an upstanding, inclined arm 40 which is adapted to pivot locking lever 12 in the release direction thereof, that is, clockwise as viewed in FIG. 2(D).

Figure 8A:
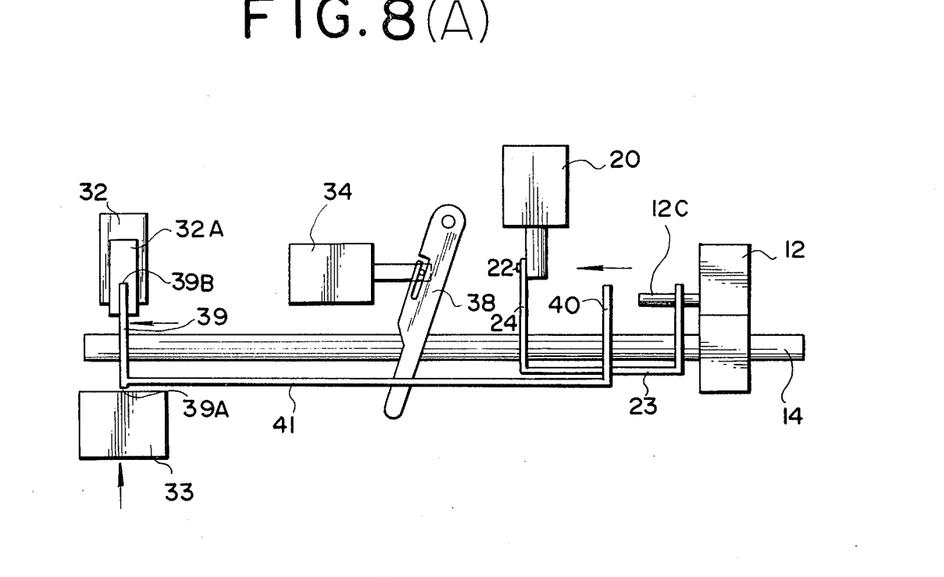
FIGS. 8(A) and 8(B) are top plan views of a mechanical lock releasing mechanism that can be used with the releasable cover locking device of FIG. 3.

When power is supplied to record playing apparatus 1, electromagnetic plunger 34 is actuated to its inoperative position. In particular, during such condition, electromagnetic plunger 34 retracts rod 35 to the left, as shown in FIG. 8(A), whereby to move operating link 41 in the same direction by means of swing link 38. As a result, stop lever 39 is positioned in opposing relation to microswitch 32 and arm 40 is positioned out of engagement with pivot rod 12C of locking lever 12. In such case, when power is supplied to record playing apparatus 1, video disk 3 is rotated at a high speed during the reproducing operation. To open cover 6, cover opening button 33 is pressed so as to actuate microswitch 32 through stop lever 39. This, in turn, controls motor 31 for stopping the rotation of disk 3. At this time, detecting device 30 detects the reduction in speed of video disk 3 below a predetermined value, and actuates electromagnetic plunger 20 to pull rod 21 inwardly which, in turn, actuates release link 23 to release locking lever 12. Thus, when cover 6 is opened, the rotational speed of video disk 3 has been reduced to a safe speed to prevent any possible danger to the user.

Figure 8B:
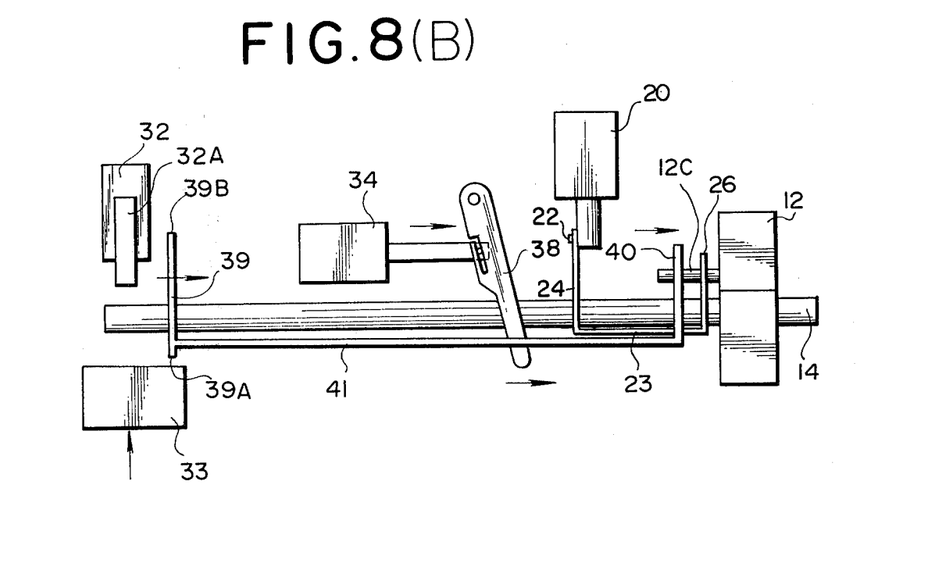

If power to record playing apparatus 1 is interrupted or turned OFF so that electromagnetic plunger 20 does not retract rod 21, rod 21 is maintained in its extended position and locking mechanism 11 is retained in its locked configuration. However, at such time, the power to electromagnetic plunger 34 is also interrupted whereby spring 38C functions to return swing link 38 to the position shown in FIG. 8(B). As a result, the free end 38A of swing link 38 biases operating link 41 to the right, as viewed in FIG. 8(B). This is also accomplished by means of return spring 42 which also functions to bias stop lever 39, and therefore operating link 41, in the same direction. It should be appreciated that regardless of the position of stop lever 39 along support shaft 14, driven arm 39A of stop lever 39 is always in opposing relation to cover opening button 33. However, as shown in FIG. 8(B), at such time, actuating arm 39B of stop lever 39 is removed from its opposing relation to microswitch 32, and an actuating surface 40A of arm 40 is in an engaging relation with pivot rod 12C of locking lever 12. To open cover 6 at such time, cover opening button 33 is pressed so that pressure surface 33A thereof actuates driven arm 39A of stop lever 39 and thereby rotates the latter about support shaft 14 in the counter-clockwise direction, as viewed in FIG. 3. This, in turn, causes arm 40 to also rotate in the same direction through operating link 41, as indicated by arrow C in FIG. 3. As a result, locking lever 12 is rotated in the clockwise direction, as viewed in FIG. 2(D), to release lock bar 8, and therefore, cover 6.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A releasable cover locking device for a recording and/or reproducing apparatus of the type in which a record medium is adapted to be moved when power is supplied to said apparatus, said releasable cover locking device comprising:
   releasable locking means;
   first release means for always automatically releasing said locking means when power is supplied to said apparatus and when the speed of movement of said record medium is less than a predetermined value; and
   second release means for releasing said locking means when said power supplied to said apparatus is interrupted.

2. A releasable cover locking device according to claim 1; further including support shaft means; and in which said releasable locking means includes first lever means rotatably mounted on said support shaft means, second lever means rotatably mounted on said support shaft means and biasing means for rotatably biasing said first and second lever means toward each other about said support shaft means.

3. A releasable cover locking device according to claim 2; in which said apparatus includes a cover having latch means, and said first and second lever means are adapted to maintain said latch means therebetween to lock said cover in a closed position.

4. A releasable cover locking device according to claim 1; further including support shaft means; and in which said releasable locking means includes first lever means rotatably mounted on said support shaft means, and biasing means for rotatably biasing said first lever means about said support shaft means to a locking position.

5. A releasable cover locking device according to claim 4; in which said first release means includes release link means for biasing said first lever means about said support shaft means to an unlocked position against the biasing force of said biasing means, and actuating means for actuating said release link means to bias said first lever means about said support shaft means to said unlocked position when the speed of movement of said record medium is less than said predetermined value and when said power is supplied to said apparatus.

6. A releasable cover locking device according to claim 5; in which said first release means further includes detecting means for detecting the speed of movement of said record medium and for supplying an output signal to said actuating means when said power is supplied to said apparatus and when the speed of movement of said record medium is detected to be less than said predetermined value so as to cause said actuating means to actuate said release link means, wherein said first lever means is biased about said support shaft means to said unlocked position.

7. A releasable cover locking device according to claim 1; in which said record medium is a record disk that is adapted to be rotated by said apparatus for one of recording information signals thereon and reproducing information signals recorded thereon.

8. A releasable cover locking device for a recording and/or reproducing apparatus of the type in which a record medium is adapted to be moved when power is supplied to said apparatus, said releasable cover locking device comprising:
   support shaft means;
   releasable locking means including first lever means rotatably mounted on said support shaft means, and biasing means for rotatably biasing said first lever means about said support shaft means to a locking position;

first release means for releasing said locking means when power is supplied to said apparatus and when the speed of movement of said record medium is less than a predetermined value, said first release means including release link means for biasing said first lever means about said support shaft means to an unlocked position against the biasing force of said biasing means, and actuating means for actuating said release link means to bias said first lever means about said support shaft means to said unlocked position when the speed of movement of said record medium is less than said predetermined value and when said power is supplied to said apparatus, said release link means being rotatably mounted on said support shaft means and including a transmitting arm for biasing said first lever means about said support shaft means to said unlocked position, a driven arm and a connecting member for connecting said driven arm to said transmitting arm; and said actuating means including a reciprocable rod connected to said driven arm and plunger means for actuating said reciprocable rod when said power is supplied to said apparatus and when the speed of movement of said record medium is less than said predetermined value, wherein said transmitting arm biases said first lever means about said support shaft means to said unlocked position; and second release means for releasing said locking means when said power supplied to said apparatus is interrupted.

9. A releasable cover locking device for a recording and/or reproducing apparatus of the type in which a record medium is adapted to be moved when power is supplied to said apparatus, said releasable cover locking device comprising:

motor means for moving said record medium;

support shaft means;

releasable locking means including first lever means rotatably mounted on said support shaft means, and biasing means for rotatably biasing said first lever means about said support shaft means to a locking position;

first release means for releasing said locking means when power is supplied to said apparatus and when the speed of movement of said record medium is less than a predetermined value, said first release means including release link means for biasing said first lever means about said support shaft means to an unlocked position against the biasing force of said biasing means, actuating means for actuating said release link means to bias said first lever means about said support shaft means to said unlocked position when the speed of movement of said record medium is less than a predetermined value and when said power is supplied to said apparatus, switch means for controlling said motor means so as to reduce the speed of movement of said record medium below said predetermined value, and stop means for actuating said switch means to control said motor means so as to reduce the speed of movement of said record medium below said predetermined value; and second release means for releasing said locking means when said power supplied to said apparatus is interrupted.

10. A releasable cover locking device for a recording and/or reproducing apparatus of the type in which a record medium is adapted to be moved when power is supplied to said apparatus, said releasable cover locking device comprising:

support shaft means;

releasable locking means including first lever means rotatably mounted on said support shaft means, and biasing means for rotatably biasing said first lever means about said support shaft means to a locking position;

first release means for releasing said locking means when power is supplied to said apparatus and when the speed of movement of said record medium is less than a predetermined value; and second release means for releasing said locking means when said power supplied to said apparatus is interrupted, said second release means including arm means for biasing said first lever means about said support shaft means to an unlocked position against the biasing force of said biasing means, positioning means for positioning said arm means into opposing relation to said first lever means when said power supplied to said apparatus is interrupted so that said arm means can bias said first lever means to said unlocked position and for positioning said arm means out of said opposing relation with said first lever means when said power is supplied to said apparatus so that said arm means cannot bias said first lever means to said unlocked position, and stop means for actuating said arm means when the latter is in said opposing relation, wherein said arm means biases said first lever means to said unlocked position.

11. A releasable cover locking device according to claim 10; in which said positioning means includes a reciprocable rod, and plunger means for actuating said reciprocable rod to position said arm means into said opposing relation when said power supplied to said apparatus is interrupted and to position said arm means out of said opposing relation when said power is supplied to said apparatus.

12. A releasable cover locking device according to claim 11, in which said arm means and said stop means are both rotatably supported about said support shaft means; and said positioning means further includes link means connecting said stop means to said arm means, and positioning lever means connected to said reciprocable rod and said link means to position said arm means into said opposing relation when said power supplied to said apparatus is interrupted and out of said opposing relation when said power is supplied to said apparatus, wherein said first lever means is biased into said unlocked position upon actuation of said stop means when said arm means is in said opposing relation.

13. A releasable cover locking device according to claim 12; in which said positioning means further includes biasing means for biasing said positioning lever means, wherein said arm means is positioned in said opposing relation when said power supplied to said apparatus is interrupted.

* * * * *